United States Patent [19]

Beasley

[11] Patent Number: 5,416,687
[45] Date of Patent: May 16, 1995

[54] POWER FACTOR CORRECTION CIRCUIT FOR AC TO DC POWER SUPPLY

[75] Inventor: Denny D. Beasley, Fairfield, Ohio

[73] Assignee: Delta Coventry Corporation, Cincinnati, Ohio

[21] Appl. No.: 902,845

[22] Filed: Jun. 23, 1992

[51] Int. Cl.⁶ .............................................. H02M 1/12
[52] U.S. Cl. ...................................... 363/44; 363/48; 363/126
[58] Field of Search ........................ 363/44, 45, 46, 47, 363/48, 126, 49, 50; 323/206

[56] References Cited

U.S. PATENT DOCUMENTS

| | | | |
|---|---|---|---|
| 1,886,180 | 11/1932 | Green . | |
| 1,975,647 | 10/1934 | Osnos . | |
| 1,976,581 | 10/1934 | Rose . | |
| 3,133,259 | 5/1964 | Van Dine . | |
| 3,147,094 | 9/1964 | Hall et al. | 363/50 |
| 3,422,341 | 6/1966 | Kurimura | 363/91 |
| 4,053,820 | 10/1977 | Peterson et al. | 363/44 |
| 4,130,790 | 12/1978 | Heisey | 323/60 |
| 4,161,772 | 7/1979 | Moerman | 363/44 |
| 4,195,334 | 3/1980 | Perry et al. | 363/44 |
| 4,222,096 | 9/1980 | Capewell . | |
| 4,238,708 | 12/1980 | Kaneda | 315/289 |
| 4,369,490 | 1/1983 | Blum | 363/48 |
| 4,462,071 | 7/1984 | Blok | 363/44 |
| 4,680,689 | 7/1987 | Payne et al. | 363/26 |
| 4,683,529 | 7/1987 | Bucher, II | 363/44 |
| 4,719,552 | 1/1988 | Albach et al. | 363/44 |
| 4,816,982 | 3/1989 | Severinsky | 363/44 |
| 4,821,166 | 4/1989 | Albach | 363/89 |
| 4,831,508 | 5/1989 | Hunter | 363/44 |
| 4,855,890 | 8/1989 | Kammiller | 363/44 |
| 4,914,375 | 4/1990 | Hatanaka | 323/206 |
| 4,930,061 | 5/1990 | Slack et al. | 363/44 |
| 4,961,044 | 10/1990 | Kravitz | 323/205 |
| 4,977,493 | 12/1990 | Smith | 363/126 |
| 5,113,335 | 5/1992 | Smith | 363/44 |
| 5,218,272 | 6/1993 | Jones | 315/247 |

*Primary Examiner*—Steven L. Stephan
*Assistant Examiner*—Adolf Berhane
*Attorney, Agent, or Firm*—Porter, Wright, Morris & Arthur

[57] ABSTRACT

A saturating inductor or transformer is used to shape input current flowing into an alternating current (AC) to direct current (DC) power supply to correct the power factor for the supply. If a saturable inductor is used, it is connected to feed current into the power supply and a capacitor is connected across the input of the power supply. The capacitor precharges the saturable inductor to a point just short of saturation during a preliminary portion of each sinusoidal half cycle of the input AC power. For steady state operation, this is the point at which current will start to flow into the AC to DC power supply and the inductor will saturate. Since the inductance falls in accordance with a permeance curve characteristic of material used to construct the inductor, the current will continue to flow at the same or an increasing level despite the declining voltage level of the AC input power. In the final portion of each half cycle of the input AC power, power stored in the inductor and capacitor discharges into the power supply to extend the current flow beyond its normal point of termination. If a saturable transformer is used, it is connected to feed current into the power supply through a secondary winding of the transformer with a primary winding of the transformer being connected to a common low voltage or ground of the source of AC power and the AC to DC power supply either directly or through primary current control means. For this embodiment, transformer action boosts the voltage level applied to the AC to DC power supply which also serves to precharge the secondary winding. As the current builds, the transformer nears saturation toward the peak of the input voltage waveform. Operation is similar in that current continues to flow or even increase during a portion of the declining voltage of the input power due to the reduced inductance caused by saturation of the transformer.

11 Claims, 5 Drawing Sheets

POWER FACTOR CORRECTION CIRCUIT FOR AC TO DC POWER SUPPLY

BACKGROUND OF THE INVENTION

The present invention relates generally to power supply circuits which generate direct current (DC) power from alternating current (AC) power and, more particularly, to a power factor correction circuit for an AC to DC power supply.

Power supplies for providing direct current (DC) power from an alternating current (AC) power supply are well known and used to power loads ranging from lighting to personal computers. Such power supplies typically include a rectifier circuit to charge a large capacity charge storage capacitor which supplies the DC power. Current input to these circuits tends to be in short pulses which have high peaks and are of short duration when compared to the substantially sinusoidal waveform of the input AC power supply. Unfortunately, the pulsing input current is rich in odd harmonics and results in a poor power factor at the input of the power supply.

A large variety of arrangements have been developed to overcome the problems associated with pulsing input current caused by rectification and energy storage in power supply circuits. Many of these arrangements are active and include transistorized control circuitry either in a discrete or integrated form. Typically, these circuits monitor the input current and use various control functions, such as pulse width modulation (PWM), to shape the input current to substantially match the input voltage and thereby produce a nearly 100% power factor for a power supply circuit.

Known active control arrangements suffer from two principal problems. First, these arrangements may be sensitive to line transients and accordingly, measures must be taken to protect the active circuitry. Second, to be able to use reasonable size power components, high frequency operation is required and can generate noise and produce line isolation problems. Correction of noise and line isolation problems requires additional circuitry which adds to the complexity and costs of these arrangements.

Many passive arrangements also exist. Although the passive arrangements are not capable of delivering substantially 100% power factor, they can provide measurable improvement in the power factor. All presently known passive arrangements depend on linear behavior of inductive components. Unfortunately, to achieve both linearity and the needed inductances for high power applications at typical low AC supply frequencies, the required inductors are physically very large making them undesirable for many applications which require compact packaging or some amount of portability.

Linear behavior of known passive arrangements fall generally into two classes of operation. The first is resonant circuit operation wherein an inductor and a capacitor are selected to resonate at preselected frequencies which are multiples of the AC power supply frequency. The inductor can be connected in series or parallel with the AC power supply and load, and is described in terms of linear circuit elements and phasor analysis in view of its linear operation and sinusoidal nature of operation.

The principal limitations of resonant linear arrangements are: poor control of the corrected wave shape due to the nature of large steel inductors and an associated low Q factor of the tuned network; and, the large size of the inductors due to the need of linear inductors to pass large currents and still maintain linear operation and low $I^2R$ losses.

The second class of passive operation is bandpass limiting. As is well known in the art, any wave shape other than a pure sinusoid is made up of other harmonics of different phases and magnitudes. The pulsing current wave created by rectification and filtering of the AC input supply is a complex wave of this nature. A bandpass limiting arrangement controls the bandpass of power from the AC power supply to block out the higher order harmonics and thereby prevent the distortion of the line current from taking place. The principal limitations of bandpass limiting are: large linear inductors are required; there is a large reduction in the effective line voltage; and, several stages of filters may be required to accomplish the desired bandpass limiting.

Accordingly, there is a need for a simple, inexpensive power phase correction circuit for an AC to DC power supply which provides a substantially improved power factor. Preferably, the power phase correction circuit would be passive for ultimate simplicity and reduced expense.

SUMMARY OF THE INVENTION

This need is met by the present invention wherein saturating circuit means are used for shaping input current flowing into an alternating current (AC) to direct current (DC) power supply. The saturating circuit means can comprise a saturable inductor or a saturable transformer connected between a source of AC power and the AC to DC power supply.

If a saturable inductor is used, it is connected to feed current into the power supply and a capacitor is connected across the input of the AC to DC power supply. The capacitor precharges the saturable inductor to a point just short of saturation during a preliminary portion of each sinusoidal half cycle of the input AC power. For steady state operation, this is the point at which current will start to flow into the AC to DC power supply and the inductor will saturate. Since the inductance falls in accordance with a permeance curve characteristic of material used to construct the inductor, the current will continue to flow at substantially the same or an increasing level in spite of the declining voltage level of the AC input power. In the final portion of each sinusoidal half cycle of the input AC power, power stored within the inductor and capacitor discharges into the AC to DC power supply to somewhat extend the current flow beyond its normal point of termination.

If a saturable transformer is used, it is connected to feed current into the power supply through a secondary winding of the transformer with a primary winding of the transformer being connected to a common low voltage or ground of the source of AC power and the AC to DC power supply either directly or through primary current control means. For this embodiment, transformer action boosts the voltage level applied to the AC to DC power supply which also serves to precharge the secondary winding. As the current builds, the transformer nears saturation toward the peak of the input AC voltage waveform. Operation is similar in that current continues to flow or even increase during a portion of the declining voltage of the input AC power due to the reduced inductance caused by saturation of the transformer. In this embodiment, input current shaping is performed in three ways: 1) boosting of line voltage by transformer coupling into the load secondary; 2) boosting by discharge of stored energy in the magnetic circuit; and, 3) shaping by variable series inductance due to nonlinear permeance curve.

In accordance with one aspect of the present invention, a power factor correction circuit for an alternating current (AC) to direct current (DC) power supply which is connected to a source of AC power comprises input means for connecting the circuit to the source of AC power and output means for connecting the circuit to the power supply circuit. Saturable circuit means are connected between the input means and the output means for shaping input current received by the input means from the source of AC power to thereby present a high power factor load for the source of AC power.

In the illustrated embodiments, the input means comprises a positive terminal and a negative terminal and the output means comprises a positive terminal and a negative terminal with the negative terminals being interconnected to one another. One embodiment of the saturable circuit means comprises a saturable inductor connected in series between the positive terminal of the input means and the positive terminal of the output means and a capacitor connected between the positive terminal of the output means and the interconnected negative terminals.

In a second embodiment, the saturable circuit means comprises a saturable transformer having a primary winding connected between the input terminal of the input means and the interconnected negative terminals and a secondary winding connected between the positive terminal of the input means and the positive terminal of the output means.

In a third and presently preferred embodiment, the saturable circuit means also comprises a saturable transformer including a primary winding having a first end connected to the input terminal of the input means and a second end and a secondary winding connected between the positive terminal of the input means and the positive terminal of the output means. This embodiment further comprises primary current control means connected between the second end of the primary winding and the interconnected negative terminals.

In the third embodiment, the primary current control means may comprise a resistor, a capacitor, a series connection of a resistor and a capacitor, or a control device activated to maintain harmonic distortion of input current within selected limits. For example, the control device may comprise a triac.

It is thus an object of the present invention to provide a simple, inexpensive power phase correction circuit for an AC to DC power supply which defines a substantially improved power factor for a source of AC input power; to provide a simple, inexpensive power phase correction circuit for an AC to DC power supply which defines a substantially improved power factor for a source of AC input power by including saturable circuit means in the power phase correction circuit; to provide a simple, inexpensive power phase correction circuit for an AC to DC power supply which defines a substantially improved power factor for a source of AC input power by including saturable inductor and capacitor in the power phase correction circuit; and, to provide a simple, inexpensive power phase correction circuit for an AC to DC power supply which defines a substantially improved power factor for a source of AC input power by including saturable transformer in the power phase correction circuit.

Other objects and advantages of the invention will be apparent from the following description, the accompanying drawings and the appended claims.

DETAILED DESCRIPTION OF THE INVENTION

Figure 1:
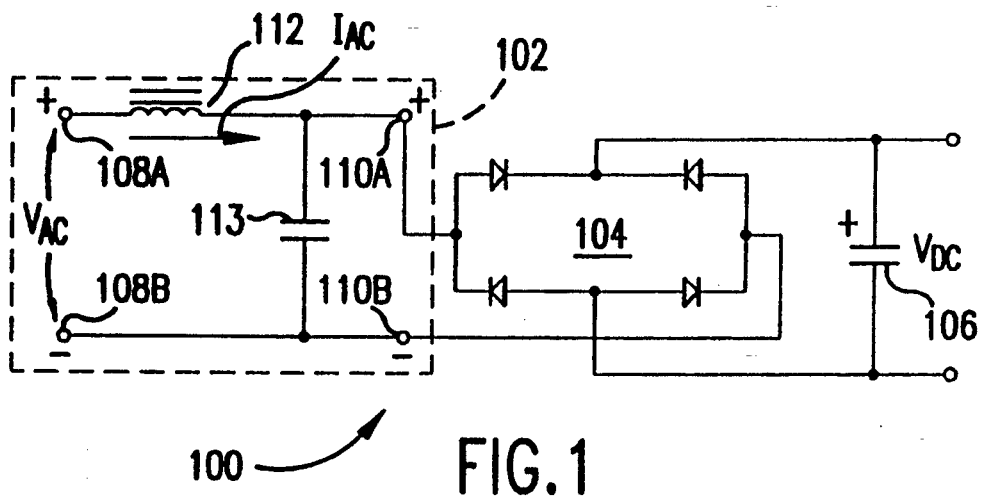
FIG. 1 is a schematic diagram of an AC to DC power supply and a first embodiment of a power factor correction circuit of the present invention.
Figure 2:
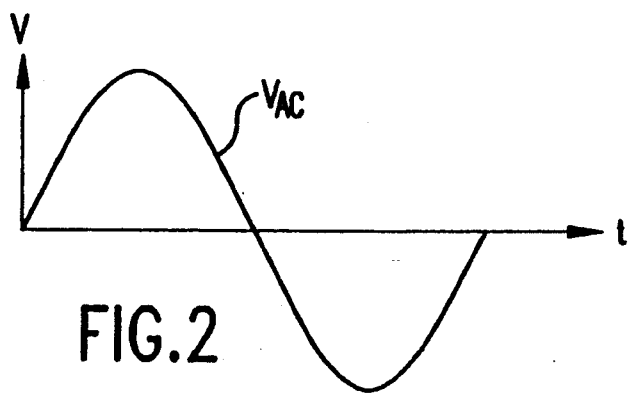
FIGS. 2 and 3 are input voltage and current waveforms, respectively, for the circuit of FIG. 1.
Figure 3:
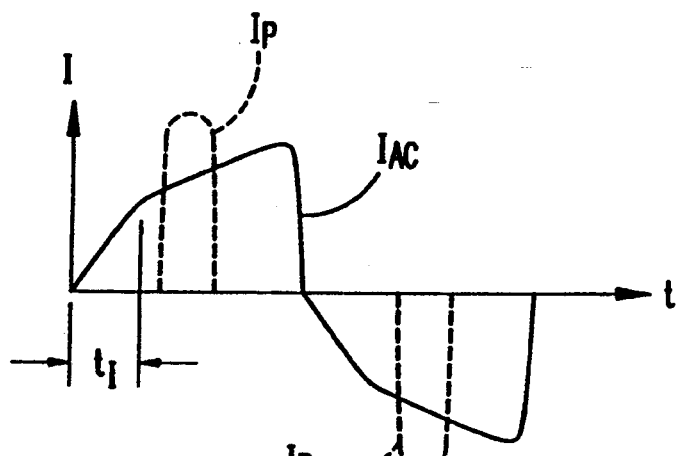

Reference will now be made to the drawing figures wherein FIG. 1 is a schematic diagram of an AC to DC power supply 100 and a first embodiment of a power factor correction circuit 102 of the present invention. The AC to DC power supply 100 includes a full-wave rectifier circuit 104 to charge a charge storage capacitor 106 which supplies output DC power $V_{DC}$. As is well known in the art, current input to such rectifier circuits tends to be in short pulses, $I_p$ shown in dotted lines in FIG. 3, which have high peaks and are of short duration when compared to the substantially sinusoidal waveform of a typical AC input power source or supply $V_{AC}$. The pulsing input current $I_p$ is rich in odd harmonics and results in a poor power factor at the AC input power source.

The power factor correction circuit 102 of FIG. 1 is connected between input means 108 for connecting the circuit 102 to a source of AC power and output means 110 for connecting the circuit 102 to the AC to DC power supply 100 to correct the current waveshape to improve the power factor toward 100%. The input means 108 comprises a positive terminal 108A and a negative terminal 108B. The output means comprises a positive terminal 110A and a negative terminal 110B. In the embodiment illustrated in FIG. 1, the negative terminals 108B and 110B are interconnected to one another and are typically at ground potential.

The power factor correction circuit 102 comprises saturable circuit means which perform the current shaping operation required for power factor correction. In the embodiment illustrated in FIG. 1, the saturable circuit means comprises a saturable inductor connected between the positive terminal 108A of the input and the positive terminal 110A of the output and a capacitor 113 connected between the positive terminal 110A of the output and the interconnected negative terminals 108B and 110B.

The power factor correction circuit 102 corrects the current waveshape to approximate a sinusoidal waveshape by utilizing the nonlinear magnetic behavior of the saturable inductor 112 which is the result of operating the inductor into saturation. The capacitor 113 conducts current to precharge the saturable inductor 112 during an initial period $t_f$ to a point 116A along an inductance or permeance curve 116, see FIG. 13 wherein the permeance curve 116 is graphed onto axes of inductance, In, and magnetizing force, MF. As the rectifier circuit 104 begins to draw current, the saturable inductor 112 saturates and, as shown by the permeance curve 116, its inductance begins to fall off. The fall off of the inductance of the saturable inductor 112 complements the fall of the input voltage $V_{AC}$ such that current flow is extended as shown by the waveform $I_{AC}$ in FIG. 3. A portion of the final current flow for each half cycle of AC power is contributed by the return of energy from the capacitor 113 and the saturable inductor 112.

Figure 4:
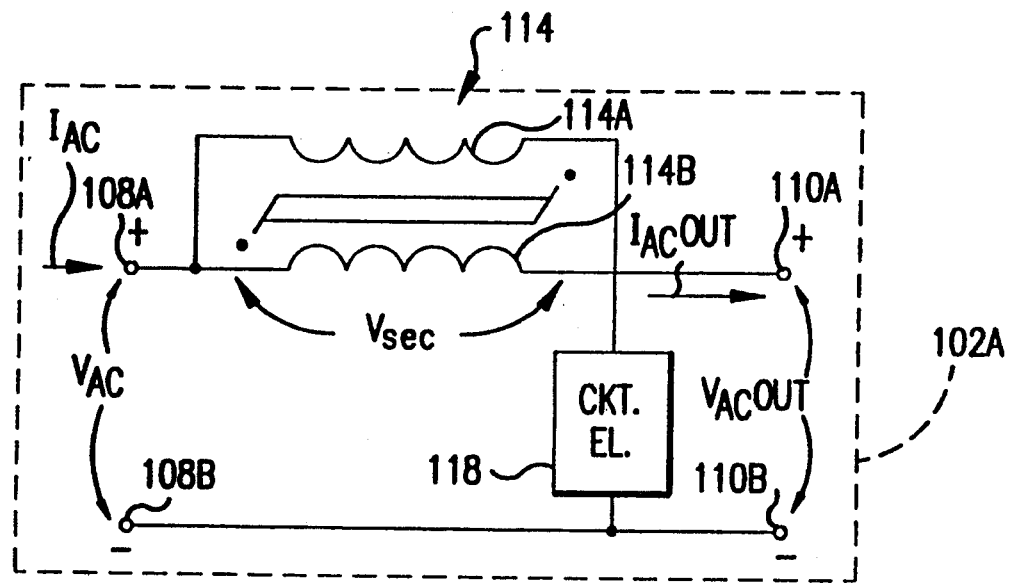
FIG. 4 is a schematic diagram illustrating alternate embodiments of the power factor correction circuit of the present invention.
Figure 5:
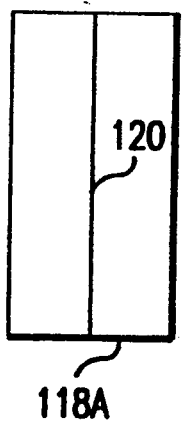
FIGS. 5–9 illustrate circuit elements for connecting the primary winding of a saturable transformer of FIG. 4 to interconnected input and output terminals of the power factor correction circuit of FIG. 4 to define the alternate embodiments of FIG. 4.

A number of alternate embodiments of a power factor correction circuit 102A of the present invention are illustrated in FIGS. 4–9 wherein FIGS. 5–9 show a variety of circuit elements 118 for connecting a primary of a saturable transformer of FIG. 4 to the interconnected negative input and output terminals 108B and 110B. In each of the embodiments of FIGS. 4–9, saturable circuit means comprises a saturable transformer 114 having a primary winding 114A connected between the positive terminal 108A of the input and interconnected negative terminals 108B and 110B, and a secondary winding 114B connected between the positive terminal 108A of the input and the positive terminal 110A of the output.

The connection of the primary winding 114A to the interconnected negative terminals 108B and 110B may be performed by a variety of circuit elements 118. The circuit elements 118 include among other possible elements which will be suggested to those skilled in the art by the disclosure of the present application the circuits elements 118A–118E of FIGS. 5–9. As shown in FIGS. 5–9, the circuit elements can comprise: a direct connection via an electrical conductor 120; a capacitor 122; a resistor 124; a combination of a resistor 126 and a capacitor 128 connected in series with one another; and, an active control device such as a triac 130.

Figure 9:
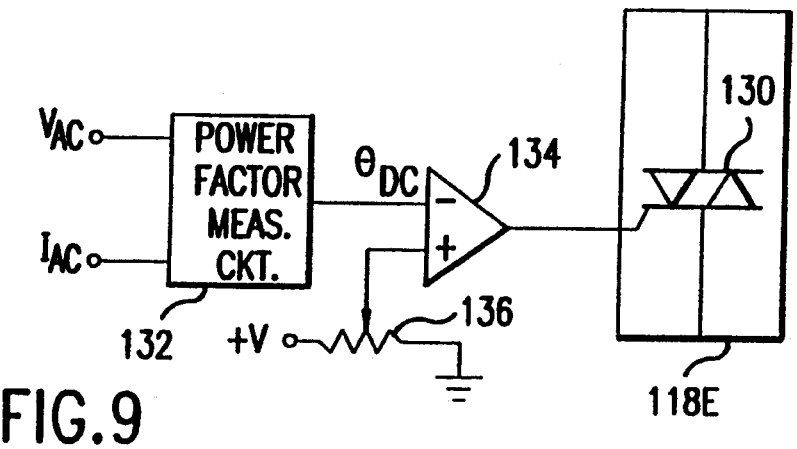

While the passive circuit elements of FIGS. 5–8 are currently believed to be preferred over an active circuit element such as the triac of FIG. 9, an active circuit element may be advantageous for some applications of the present invention. When an active circuit element is used, additional control circuitry is required for proper operation of the power factor correction circuit.

An example of control circuitry is illustrated in combination with the triac 130 of FIG. 9. The control circuitry of FIG. 9 includes a power factor measuring circuit 132 which is connected to receive $V_{AC}$ and $I_{AC}$ of the power factor control circuit 102A and generate a DC voltage $\ominus_{DC}$ representative of the power factor corresponding to the input voltage $V_{AC}$ and current flow $I_{AC}$. The DC voltage $\ominus_{DC}$ from the power factor measuring circuit 132 is passed to a comparator circuit 134 which compares the DC voltage $\ominus_{DC}$ to a reference voltage selected by a potentiometer 136. In this way, the triac 130 can be selectively activated at power factor differences at or above a power factor selected by the setting of the potentiometer 136.

Operation of the embodiments of the power factor correction circuits shown in FIGS. 4–9 including saturable transformers will now be described. The most fundamental of these embodiment includes the interconnection circuit element of FIG. 5, i.e. the direct connection of the primary winding 114A to the interconnected negative terminals 108B and 110B via the electrical conductor 120. Thus, the primary winding 114A is shunted across the AC input and the secondary winding 114B is connected in series between the positive terminal 108A of the input and the positive terminal 110A of the output.

The primary winding 114A shunted across the input serves two purposes: 1) when the transformer 114 is not in saturation, the primary winding 114A is coupled to the secondary winding 114B and serves to boost the line voltage $V_{AC}$ by the voltage induced in the secondary winding 114B. That is $V_{ACOUT} = V_{AC} + V_{sec}$; 2) as the current builds up in the secondary winding 114B, the combined MMFs of the secondary winding 114B and the primary winding 114A bring the core magnetic state to saturation near the peak of the applied sine wave input voltage $V_{AC}$ and thereby serve to prebias the magnetic state.

The secondary winding 114B serves as a control element through which the current to a connected circuit, such as the AC to DC power supply 100 of FIG. 1, is passed and shaped. The shaping process is accomplished in three ways: 1) the input voltage $V_{AC}$ is boosted by transformer coupling from the primary winding 114A into the secondary winding 114B; 2) boosting performed by the discharge of stored energy in the magnetic circuit as the transformer comes out of saturation; and, 3) shaping performed by the complementary action of the variable inductance due to saturating operation of the saturable transformer 114. The coordination in time of the control parameters is brought about by the primary winding 114A shunted across the input voltage source. The primary winding 114A biases the magnetic circuit for operation into a variable inductance/permeance mode and provides line boosting when it is not in saturation.

Figure 6:
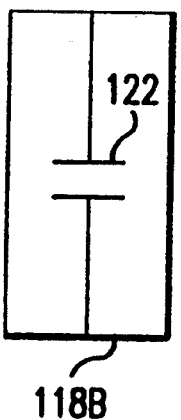
Figure 7:
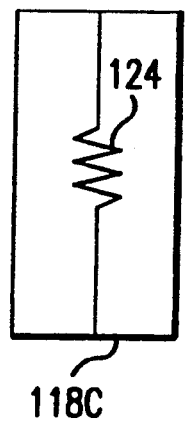
Figure 8:
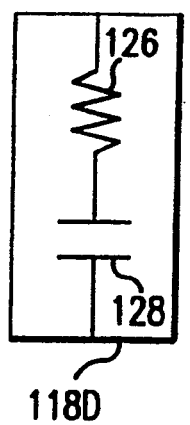
Figure 14:
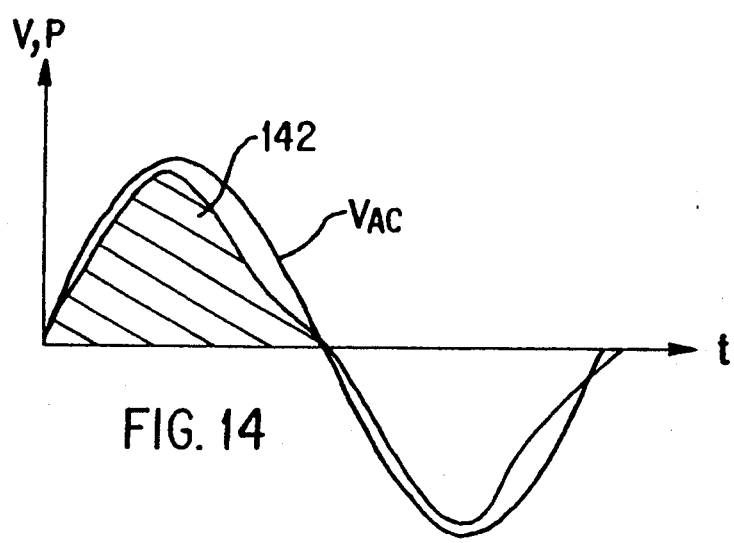
FIGS. 14 and 15 illustrate waveforms for the power factor correction circuit of FIG. 4 for direct and capacitive primary coupling, respectively; and, FIG. 16 is a side view of a saturable inductor which can be used in the preferred form of the power factor correction circuit of the present invention; and, FIG. 17 is a sectional view of the saturable inductor of FIG. 16 taken along the section line 17—17.
Figure 15:
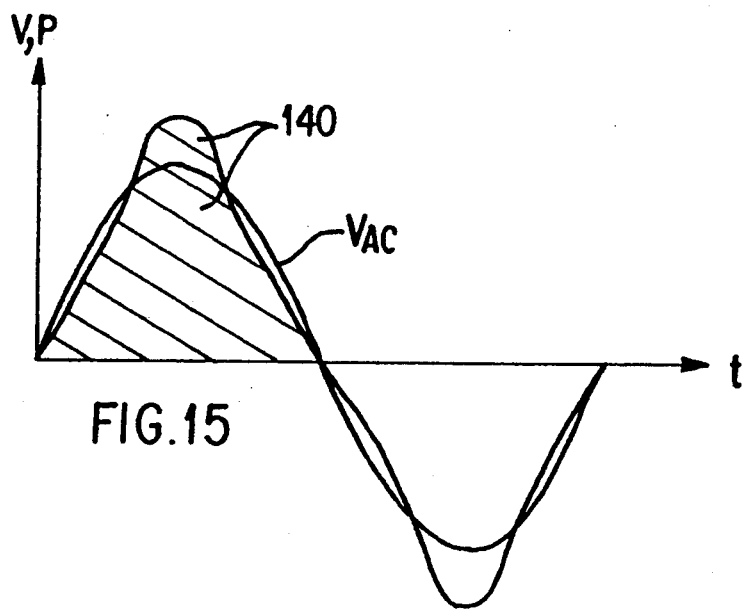
Figure 16:
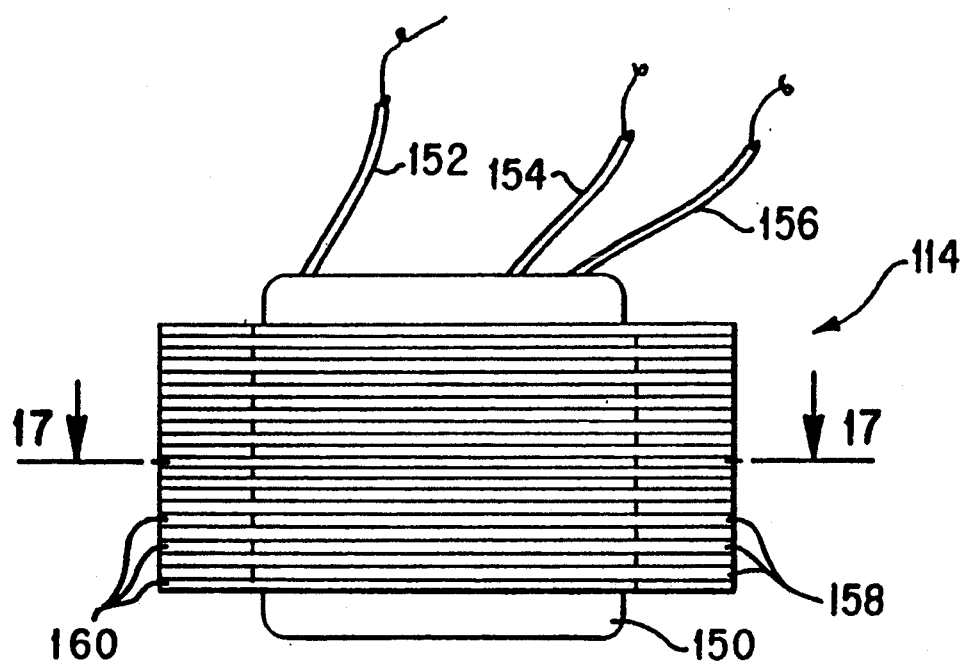
Figure 17:
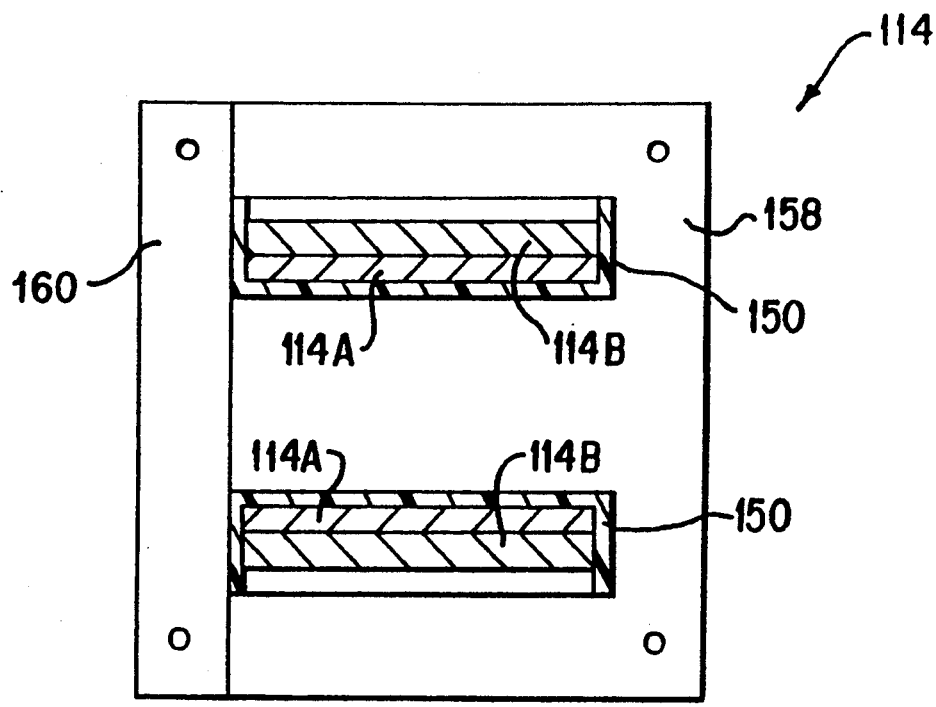

Operation of the remaining embodiments of FIGS. 4 and 6–9 is similar to the direct connection with the use of the passive and active elements of FIGS. 6–9 performing the following modifications. Interconnecting a resistance such as the resistor 124 of FIG. 7 is a simple way to control the rate of rise of current in the primary winding 114A and thereby coordinate the saturation and phase angle of the applied wave shape. The use of a series capacitance such as the capacitor 122 of FIG. 6 is a simple way to reduce the primary winding 114A $I^2R$ losses. The area 140 of FIG. 15 is representative of the power dissipated in the primary winding 114A with the direct connection of the primary winding by the electrical conductor 120 while the area 142 of FIG. 14 is representative of the power dissipated in the primary winding 114A with the capacitor 122 of FIG. 6 used to connect the primary winding 114a to the interconnected terminals 108B and 110B.

As would be expected, the series combination of the resistor 126 and the capacitor 128 provides a combination of the effects of the use of a resistor alone or a capacitor alone.

Control of the circuit with an active circuit element, such as the triac 130 of FIG. 9, is dependent upon the selected power factor to be tolerated by active control of the level of bias current in the primary winding 114A in magnitude and time.

Figure 10:
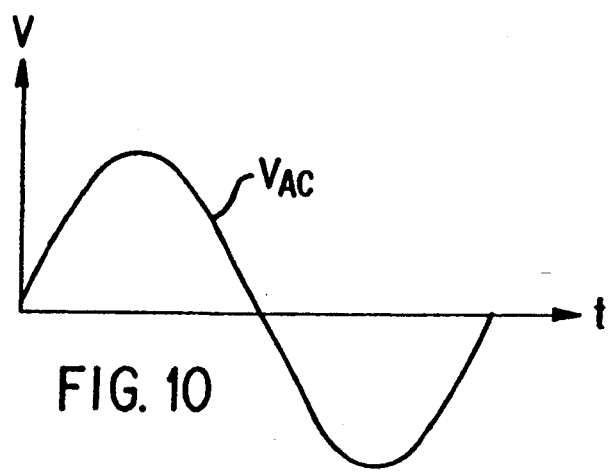
FIGS. 10–12 are waveforms for one form of the power factor correction circuit of FIG. 4.
Figure 11:
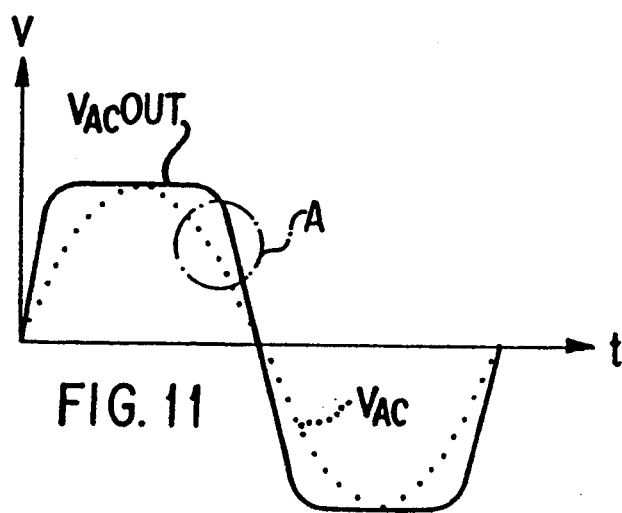
Figure 11A:
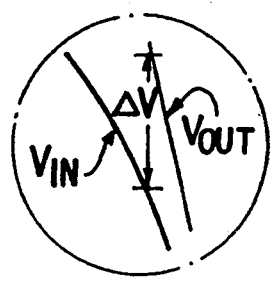
FIG. 11A is an enlarged view of the area of the waveform in FIG. 11 that is indicated in the circle labeled A.

A general description of the operation of the present invention will now be made with reference to FIGS. 10-12. FIG. 11A is an enlarged view of the area or the waveform in FIG. 11 that is indicated in the circle labeled A. In the following description, the output current $I_{ACOUT}$ of FIG. 4 will be broken up into three regions shown in FIG. 12 and the operation is assumed to be in a steady state condition. In each region, different variables dominate the behavior of the power factor correction circuit.

Figure 12:
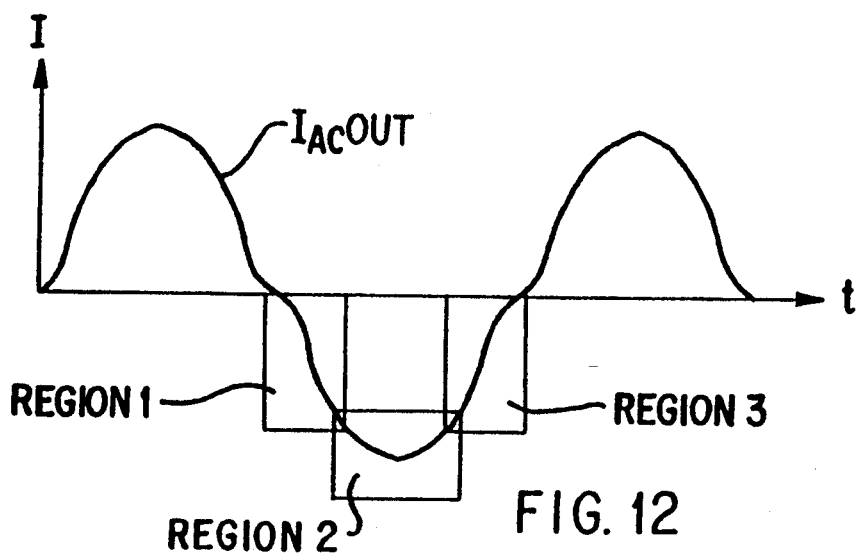

Starting at zero crosspoint in region 1 of FIG. 12, the core of the saturable transformer 114 has made a positive to negative transition of magnetic polarity. Most of the stored energy in the core magnetics, from the positive cycle, has been discharged into the load, such as the AC to DC power supply 100 of FIG. 1 and the core flux begins to build negatively. The increase in core flux in the negative direction is nearly linear at first and is coupled to the secondary winding 114B inducing a voltage $V_{SEC}$ in phase with the input voltage $V_{AC}$. This induced voltage thus adds to the input voltage $V_{AC}$ to thereby increase the voltage $V_{ACOUT}$ available at the output side of the secondary winding 114B as shown in FIG. 11. This early rise of voltage hastens conduction in the rectifier circuit 104 and charge storage capacitor 106 and the series inductance of the secondary winding 114B controls the rate of rise of current.

By design, the core of the transformer 114 begins to saturate in the overlap area of region 1 and region 2. The boosting effect becomes insignificant in region 2 wherein the high series inductance of the secondary winding 114B exhibited in region 1 would greatly limit the maximum current throughput if it remained at its high levels of region 1. However, due to saturation of the saturable transformer 114 and the nature of the permeance curve 116 shown in FIG. 13, the inductance begins to decline in this overlap area.

This inductance decline brings the operation into region 2 wherein the core of the transformer 114 begins to saturate and the permeance begins to fall. As the slope of the input voltage $V_{AC}$ is declining, so is the series inductance of the secondary winding 114B. The declining inductance of the secondary winding 114B shapes the current in region 2.

As the current declines, the core of the transformer 114 unsaturates and boosting by transformer action once again sustains the output voltage $V_{ACOUT}$ to continue conduction. The energy stored in the core of the transformer 114 also helps to sustain conduction in region 3 and becomes the primary current sustaining energy source when the primary winding 114A is capacitively coupled as in FIGS. 6 and 8.

Figure 13:
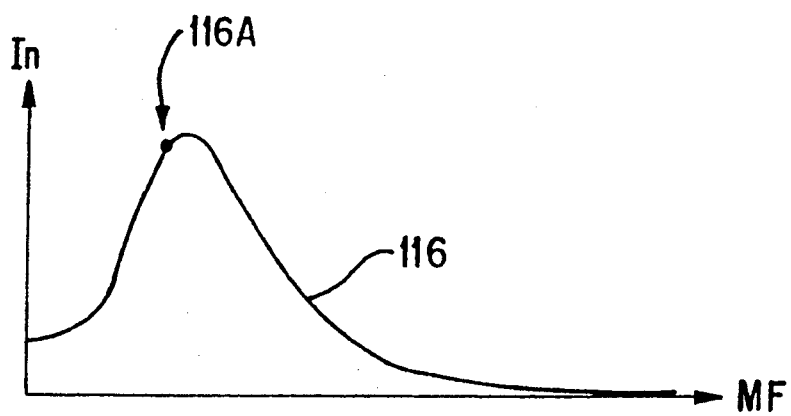
FIG. 13 is a graph of the permeance of material for constructing a transformer of the preferred embodiment of the present invention.

The following is a first iteration design for the magnetic assumptions and phase/time coordination of the onset of saturation for the transformer 114. At 30°, the value of the sine function is 0.5 of its maximum value and the area under this part of the sine function curve is 13% of an entire half cycle. Accordingly, little energy is transferred during the first 30° interval which justifies the use of a small primary winding. Beyond the 30° point, saturation will begin to limit the rise of voltage at the output. The rate of increase and therefore the shape of the current waveform is controlled by the series inductance associated with the secondary winding 114B. The inductance of the secondary winding 114B is dependent on the permeance of the steel used to construct the transformer 114. As seen in FIG. 13, the permeance curve 116 is sine-like and becomes the pattern over which the current is formed.

The transformer embodiment of the invention shown in FIG. 4 including the capacitor 122 of FIG. 6 for interconnecting the primary winding 114A to the terminals 108B and 110B, is currently preferred. A working embodiment of the invention has been constructed and operated for this embodiment as will now be described. The transformer is constructed using a bobbin 150 upon which the primary winding 114A is initially placed with the secondary winding 114B being placed over the primary winding 114A upon the bobbin 150. A common connection is made at the finish of the primary winding 114A and the beginning of the secondary winding 114B, which common connection is brought out on a conductor 152. The opposite ends of the primary winding 114A and the secondary winding 114B are brought out on conductors 154 and 156. The core stack for the transformer 114 is of butt and lapp construction accomplished by alternating E-sections of core material represented by an E-section 158 and I-sections of core material represented by an I-section 160.

In working embodiments of the preferred form of the present invention, the transformer 114 was made using 180 turns of #25 wire in three layers at the bottom of the bobbin 150 for the primary winding 114A, and 180 turns of #19 wire in four layers to form the secondary winding 114B over the primary winding 114A. The core E-sections and I-sections were a standard ⅞ inch, center dimension, scrapeless lamination of M6 29 gauge steel. The core stack height using the EI ⅞ core sections was 1 inch for 250 watt capacity and 1 ⅜ inches for 400 watt capacity. When using a different core section with the same number of turns the magnetic cross section of the core should remain the same.

When the E and I-sections are stacked, it is important to ensure complete closure of each lamination section since failure to do so will result in linearization of the core magnetics and improper operation of the power factor correction circuit. While the stack of core sections are uncompressed, the transformer is saturated with potting material. The stack is then compressed and allowed to cure to form the transformer. For these embodiments of the present invention, the transformers are used with the capacitor 122 having a capacitance of 4.7 microfarads.

Having thus described the present invention in detail and by reference to preferred embodiments thereof, it will be apparent that modifications and variations are possible without departing from the scope of the invention defined in the appended claims.

What is claimed is:

1. A power factor correction circuit for an alternating current (AC)-to-direct current (DC) power supply which is connected to an AC power source having a predetermined sinusoidal voltage waveform and a pulsing input current waveform, said circuit comprising:
   a first connector for connecting said circuit to an AC power source;
   a second connector :for connecting said circuit to the AC-to-DC power supply; and an electrically saturable component connected between the first connector and the second connector for shaping the waveform of the input current received by the first connector from the source of AC power, the component being formed from a material having an innate nonlinear permeance curve such that, as the circuit begins to draw current from the AC power source, the inductance of the component follows, in a timed fashion, the shape of the permeance curve in correspondence with the drop of the input voltage from the AC power source and the component shapes the waveform of the current flow through the circuit to expand the duration of the current pulses received from the AC power source before the current is input into the power supply, to thereby present a high power factor load for the AC power source.

2. The power factor correction circuit of claim 1 wherein said first connector comprises first and second terminals, said second connector comprises a positive terminal and a negative terminal, the second terminal of the first connector and the negative terminal of the second connector being interconnected to one another, and the electrically saturable component comprises a saturable inductor connected in series between the first terminal of the first connector and the positive terminal of the second connector and a capacitor connected between the positive terminal of the second connector and the interconnected terminals of the first and second connectors.

3. The power factor correction circuit of claim 1 wherein said first connector comprises first and second terminals, said second connector comprises a positive terminal and a negative terminal, the second terminal of the first connector and the negative terminal of the second connector being interconnected to one another; and the electrically saturable component comprises a saturable transformer having:
a primary control winding that sets the point at which inductance begins to collapse along the permeance curve, said primary control winding being connected between the first terminal of the first connector and the interconnected terminals of the first and second connectors; and
a secondary winding controlled by said primary control winding connected between the first terminal of the first connector and the positive terminal of the second connector, having the characteristic such that the secondary winding interacts in the circuit to expand the waveform pulse of the input current when inductance follows the permeance curve.

4. The power factor correction circuit of claim 2 wherein the capacitance of the capacitor is calculated, based on the permeance curve characteristic of material used to construct the saturable inductor to precharge the saturable inductor to a point just short of saturation during a preliminary portion of each sinusoidal half cycle of the input AC power, such that the current will continue to flow at substantially the same or an increasing level even though the voltage level of the input AC power is declining and, during the final portion of each sinusoidal half cycle of the input AC power the power stored within the inductor and capacitor discharges into the AC-to-DC power supply to extend the current flow beyond its normal point of termination by expanding the duration of the input current pulses received from the AC power source before the current is input into the power supply.

5. A power factor correction circuit for an alternating current (AC)-to-direct current (DC) power supply which is connected to an AC power source having a predetermined sinusoidal voltage waveform and a pulsing input current waveform, said circuit comprising:
a first connector for connecting the circuit to a source of AC power, wherein the first connector comprises first and second terminals;
a second connector for connecting the circuit to the AC-to-DC power supply, wherein the second connector comprises a positive terminal and a negative terminal, the second terminal of the first connector and the negative terminal of the second connector being interconnected;
an electrically saturable component, connected between the first connector and the second connector, for shaping the waveform of the input current, received by the first connector from the source of AC power, the component being formed from a material that defines an innate nonlinear permeance curve for the component, such that, as the circuit begins to draw current from the AC power source, the inductance of the component follows, in a timed fashion, the shape of the permeance curve in correspondence with the drop of the input voltage from the AC power source and the component shapes the waveform of the current flow through the circuit to expand the duration of the current pulses received from the AC power source before the current is input into the power supply to thereby present a high power factor load for the AC power source;
the electrically saturable component comprising a saturable transformer having:
a primary control winding that sets the point at which inductance begins to collapse along the permeance curve, the primary control winding having two ends, wherein one end is connected to the first terminal of the first connector; and
a secondary winding controlled by the primary control winding connected between the first terminal of the first connector and the positive terminal of said second connector: and
a primary current controller connected between the second end of the primary control winding and the interconnected terminals of the first and second connectors.

6. The power factor correction circuit of claim 5 wherein said primary current controller comprises a resistor.

7. The power factor correction circuit of claim 5 wherein said primary current controller comprises a capacitor.

8. The power factor correction circuit of claim 5 wherein said primary current controller comprises a series connection of a resistor and a capacitor.

9. The power factor correction circuit of claim 5 wherein said primary current controller comprises a control device activated to maintain harmonic distortion of input current within selected limits.

10. A power factor correction circuit as claimed in claim 9 wherein said control device comprises a triac.

11. A power factor correction circuit for an alternating current (AC)-to-direct current (DC) power supply which is connected to an AC power source having a predetermined sinusoidal voltage waveform and providing input current pulses, said circuit comprising:
- a first connector for connecting said circuit to an AC power source;
- a second connector for connecting said circuit to the AC-to-DC power supply; and
- a component connected between the first connector and the second connector for shaping the wave form of the input current received by the first connector from the AC power source, the component presenting an inductance that follows the shape of an innate nonlinear permeance curve such that in correspondence with a drop of the input voltage from the AC power source, the component shapes the waveform of the current flow through the circuit to expand the duration of the current pulses received from the AC power source before the current is input into the power supply, to thereby present a high power factor load for the AC power source.

* * * * *